United States Patent [19]
Patterson

[11] 3,848,893
[45] Nov. 19, 1974

[54] DUAL TRAILER HITCH ATTACHMENT

[76] Inventor: James M. Patterson, 15246 E. Weeks Dr., La Mirada, Calif. 90638

[22] Filed: May 18, 1973

[21] Appl. No.: 361,457

[52] U.S. Cl.............. 280/417, 280/415 A, 280/511
[51] Int. Cl.............................................. B60d 1/06
[58] Field of Search........................ 280/417, 415 A

[56] References Cited
FOREIGN PATENTS OR APPLICATIONS
1,016,570  9/1957  Germany ............................ 280/417

Primary Examiner—Leo Friaglia
Attorney, Agent, or Firm—Whann & McManigal

[57] ABSTRACT

A trailer hitch attachment for selectively converting a hitch of the coupling-pintle type to a ball-and-socket type, wherein a body structure mounting a pintle is connected with the coupling, and the body structure mounts an element of a ball-and-socket hitch for connection with an associated mating element of a conventional ball-and-socket hitch.

2 Claims, 4 Drawing Figures

PATENTED NOV 19 1974

3,848,893

DUAL TRAILER HITCH ATTACHMENT

PRIOR ART

In the prior art there are a number of hitch embodiments susceptible of selective variation to accommodate different types of hitch connections. The closest art known to applicant are the following patents:

| | |
|---|---|
| 1,422,129 | July 11, 1922 |
| 2,827,307 | March 18, 1958 |
| 3,123,382 | March 3, 1964 |

BACKGROUND OF THE INVENTION

The present invention relates generally to trailer hitches.

Trailers and other equipment arranged to be pulled by a truck, automobile or other vehicle may be equipped with varied types of attachment means. For example, the trailer hitch may comprise connecting means of the coupling-pintle type or may comprise connecting means of the ball-and-socket type. It will therefore be appreciated that if a towing vehicle is equipped with a coupling it can be readily attached to the pintle of a trailer, but is not connectible with the connecting element of a ball-and-socket type hitch. A problem thus arises.

The present invention proposes to solve this problem by providing a simple unique attachment which can be readily connected with the coupling of a coupling-pintle type hitch, and which mounts a ball or socket element of a ball-and-socket hitch so as to enable connection of the towing vehicle with a trailer adapted for use in a ball-and-socket type hitch connection.

When the trailer hitch is of the coupling-pintle type, then the attachment would not be used.

SUMMARY OF THE INVENTION

The present invention relates generally to trailer hitches, and is more particularly concerned with unique means for converting a trailer hitch of one type to a trailer hitch of another type so that the towing vehicle may be used for towing a trailer having either type hitch.

One object of the invention is therefore to provide a unique trailer hitch arrangement which can be selectively varied to provide a hitch of the coupling-pintle type or ball-and-socket type.

A further object is to provide as an article of manufacture an attachment of simple and relative inexpensive construction for converting a hitch of the coupling-pintle type to a ball-and-socket type.

Further objects and advantages of the invention will be brought out in the following part of the specification, wherein detailed description is for the purpose of fully disclosing an embodiment of the invention without placing limitations thereon.

BRIEF DESCRIPTION OF THE DRAWINGS

Referring to the accompany drawings, which are for illustrative purposes only.

DESCRIPTION OF A PREFERRED EMBODIMENT

Figure 1:
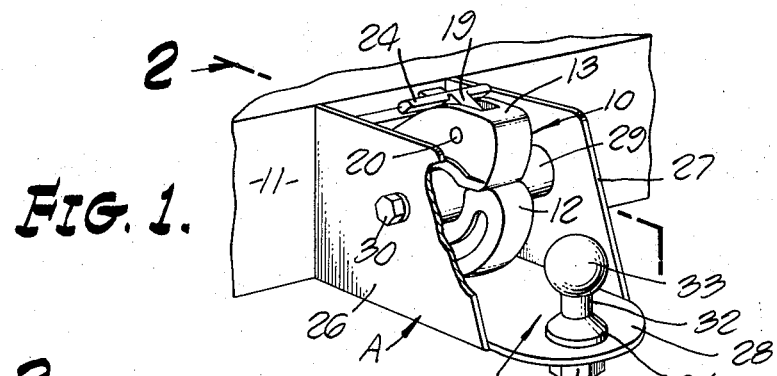
FIG. 1 is a perspective view showing the attachment of the present invention operatively connected with the coupling of a coupling-pintle type hitch.

Referring more particularly to the drawings, for illustrative purposes, the invention is shown as generally comprising an attachment A, which is operatively connected with a coupling device 10 of a coupling-pintle type trailer hitch, the coupling device being securely mounted on a frame member 11 of a towing vehicle.

The coupling device is of conventional construction and comprises a pair of relatively movable jaw structures which are shown as including a fixed jaw 12 and a movable or swingable jaw 13. The fixed jaw 12 is rearwardly formed to provide a generally rectangular base 14 which is secured against the face of the frame member 11 of the vehicle by means of a plurality of anchor bolts 15. The outermost end of the fixed jaw is of arcuate configuration to provide a generally curved and arcuate recess 16 with an entrance opening 17 adapted to receive the pintle of a coupling-pintle type hitch therein into a seated position.

The swingable or movable jaw 13 is supported at one end of the fixed jaw by means of a pivot 18 which permits swinging movement of the jaw 13 between an open and bridging position with respect to the opening 17. In the bridging position, the movable jaw forms a keeper for retaining the pintle in the recess 16.

Figure 2:
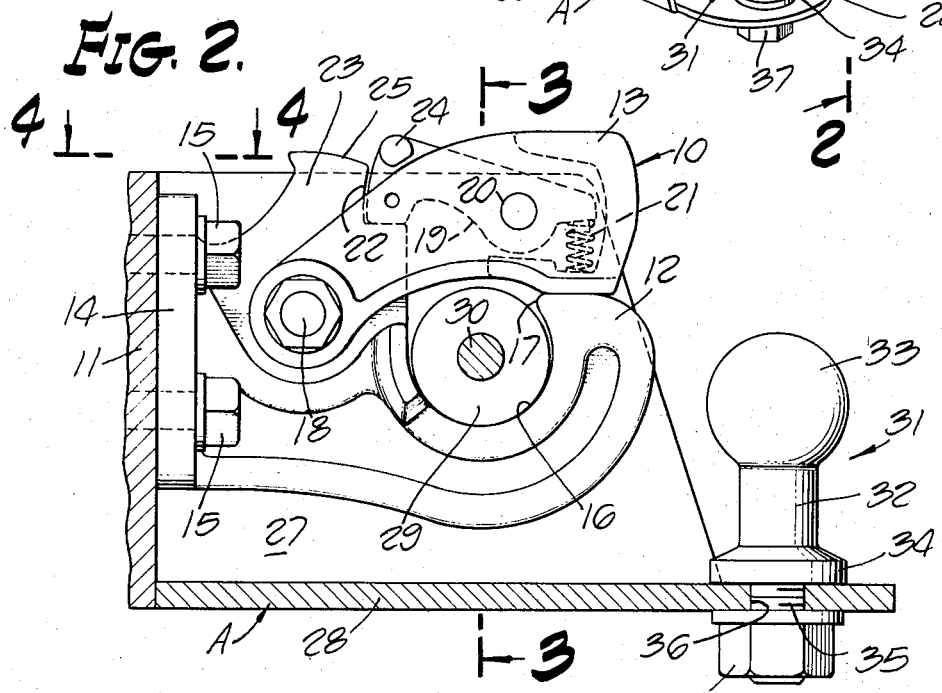
FIG. 2 is an enlarged sectional view, taken substantially on line 2—2 of FIG. 1.
Figure 3:
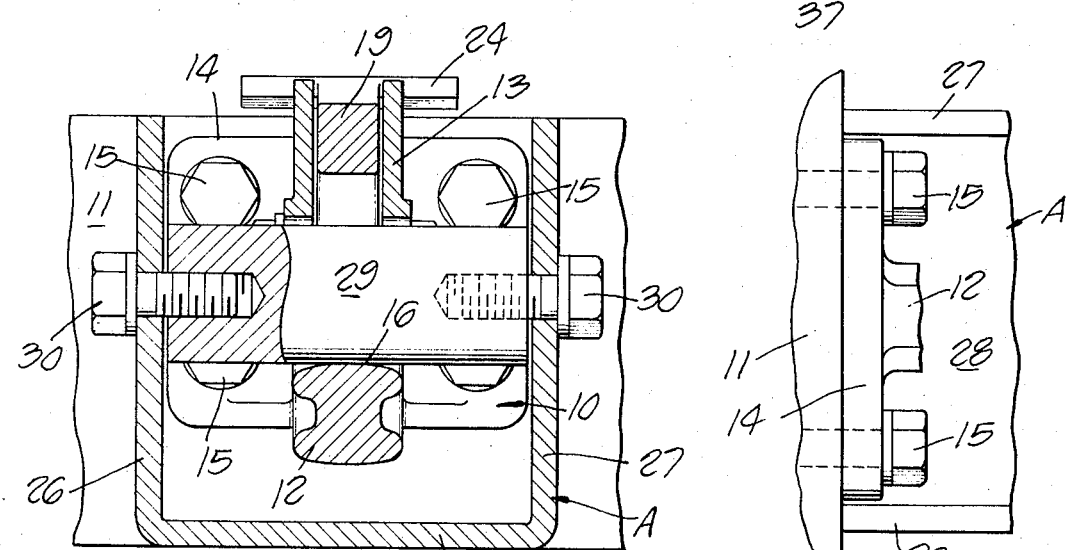
FIG. 3 is a transverse section taken substantially on line 3—3 of FIG. 2.
Figure 4:
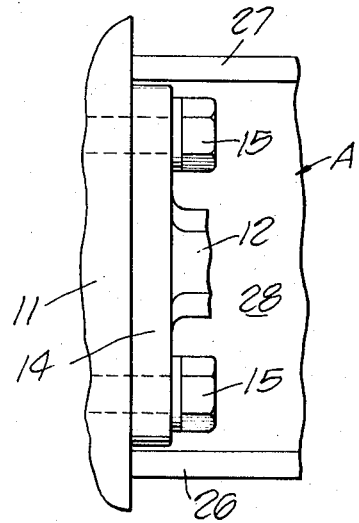
FIG. 4 is a fragmentary view as seen from line 4—4 of FIG. 2, showing details of attachment of the coupling to a towing vehicle.

Provision is made for releasably latching the movable jaw 13 in its bridging position. For this purpose, the movable jaw carries a latching lever 19 which is pivoted intermediate its ends on a pivot pin 20, a coiled spring 21 being engaged under one end of the latching lever to resiliently urge the lever in a counter-clockwise direction, as seen in FIG. 2, towards a latching position. The other end of the latching lever is arranged in its latching position to abut against a retaining shoulder formed in a projecting portion 23 of the fixed jaw. The latch lever is arranged to be moved in a counter-clockwise direction against the force of the spring 21 into a non-latching position by means of a finger grip bar 24. Upon raising the latch member, sufficiently to clear the shoulder 22, this end of the latch member will be permitted to ride over a surface 25 at the outer end of the projection 23, and thus allow swinging movement of the jaw 13 to an open position in which the pintle of the coupling-pintle type hitch may be inserted or removed from the coupling.

It will, of course, be appreciated that a coupling device as just described is not susceptible of connection with a trailer which is equipped with an element of a ball-and-socket type hitch. In order to convert the coupling of the towing vehicle so that it may be used for a ball-and-socket type hitch, an attachment A, according to the present invention, is utilized. While the actual physical construction may vary, the attachment is shown as comprising a generally U-shaped body structure which is fabricated from plate material to provide spaced side walls 26 and 27 and a bridging wall 28. A cylindrical pintle 29, similar to that utilized in a hitch of the coupling-pintle type, is secured at its ends by mounting bolts 30—30 respectively, so that the pintle extends transversely between the side walls 26 and 27.

As thus arranged, the U-shaped body can straddle the coupling device and permit the pintle 29 to be grippingly engaged by the jaws of the coupling device 10, and when so mounted, the inner edges of the side walls 26 and 27 and bridging wall 28 will abut the outer surface of the frame member 11 and thus oppose swinging movement of the body structure about the axis of the pintle 29. It will also be apparent that with the side walls 26 and 27 respectively positioned on opposite sides of the base 14, longitudinal movement of the pintle 29 within the coupling device will be prevented.

As best shown in FIGS. 1 and 2, the bridging wall 28 is extended outwardly beyond the coupling device 10 and has mounted thereon an element of a ball-and-socket type hitch. In this case a ball element, as indicated generally at 31, is mounted thereon. This ball element comprises an upstanding shank portion or pedestal 32 having a generally spherical head portion 33 at one end, and a mounting flange 34 for engaging the upper surface of the bridging wall 28. A threaded extension 35 at this end is arranged to extend through an opening 36 of the bridging wall for engagement by an appropriate retaining nut 37. The ball element is thus mounted in an appropriate position to connect with the mating element of a ball-and-socket hitch, which may be carried by the trailer.

From the foregoing description and drawings, it will be clearly evident that the delineated objects and features of the invention will be accomplished.

Various modifications may suggest themselves to those skilled in the art without departing from the spirit of my invention, and, hence, I do not wish to be restricted to the specific forms shown or uses mentioned, except to the extent indicated in the appended claims.

I claim:

1. As an article of manufacture, an attachment for converting a towing vehicle trailer hitch of the coupling-pintle type to a ball-and-socket type, comprising:

a. a body structure;
    b. a pintle carried by said body structure adapted for pulling connection with a trailer hitch coupling;
    c. a component of a ball-and-socket hitch carried by said body, adapted for pulling connection with a mating component of a ball-and-socket hitch; and d. said body being of U-shaped configuration with spaced side walls and a bridging bottom wall, the inner edges of said walls being adapted to engage an outer surface of the towing vehicle and being adapted to straddle the coupling of the trailer hitch, the pintle being supported at its ends in the side walls.

2. An article of manufacture according to claim 1, wherein the component carried by said body comprises a ball element, said element being mounted on said bridging wall in outwardly spaced relation to said pintle.

* * * * *